United States Patent
Kim et al.

(10) Patent No.: US 10,479,884 B2
(45) Date of Patent: Nov. 19, 2019

(54) AQUEOUS COMPOSITION FOR HARD SURFACE APPLICATIONS WITH ENHANCED STABILITY

(71) Applicant: Chemetall US, Inc., New Providence, NJ (US)

(72) Inventors: Hoon Kim, Basking Ridge, NJ (US); Ronald Ascenzo, Califon, NJ (US); Peter Konopi, Clark, NJ (US)

(73) Assignee: CHEMETALL U.S., INC., New Providence, NJ (US)

( * ) Notice: Subject to any disclaimer, the term of this patent is extended or adjusted under 35 U.S.C. 154(b) by 166 days.

(21) Appl. No.: 15/612,270

(22) Filed: Jun. 2, 2017

(65) Prior Publication Data

US 2017/0349739 A1 Dec. 7, 2017

Related U.S. Application Data

(60) Provisional application No. 62/345,267, filed on Jun. 3, 2016.

(51) Int. Cl.
| | |
|---|---|
| *C08L 35/00* | (2006.01) |
| *C08L 25/02* | (2006.01) |
| *C08F 10/14* | (2006.01) |
| *C10M 171/04* | (2006.01) |
| *C10M 173/00* | (2006.01) |
| *C08L 23/18* | (2006.01) |
| *C08L 33/04* | (2006.01) |

(52) U.S. Cl.
CPC .............. *C08L 25/02* (2013.01); *C08F 10/14* (2013.01); *C10M 171/04* (2013.01); *C10M 173/00* (2013.01); *C08F 2500/01* (2013.01); *C08F 2500/03* (2013.01); *C08F 2500/10* (2013.01); *C08L 23/18* (2013.01); *C08L 33/04* (2013.01); *C08L 2203/00* (2013.01)

(58) Field of Classification Search
CPC .............................. C08F 210/14; C08F 222/06
See application file for complete search history.

(56) References Cited

U.S. PATENT DOCUMENTS

| | | | |
|---|---|---|---|
| 5,205,960 A * | 4/1993 | Kristopeit | C11D 1/835 510/284 |
| 6,100,221 A | 8/2000 | Poelker et al. | |
| 2011/0146983 A1* | 6/2011 | Sawdon | C09K 8/36 166/276 |
| 2012/0111079 A1 | 5/2012 | Genat et al. | |

FOREIGN PATENT DOCUMENTS

WO 2013123102 A2 8/2013

OTHER PUBLICATIONS

Di Cola, Macromolecules, vol. 37, No. 22, 2004, p. 8457-8465 (Year: 2004).*
International Search Report and Written Opinion for International Application No. PCT/US2017/035723, dated Jun. 2, 2017, 15 pages.

* cited by examiner

*Primary Examiner* — Robert C Boyle
(74) *Attorney, Agent, or Firm* — Armstrong Teasdale LLP

(57) ABSTRACT

The present invention relates to an aqueous composition with enhanced stability for hard surface applications containing at least one lipophilic compound and at least one copolymer, in which the at least one copolymer is a comb-type branched copolymer exhibiting an alternating sequence of monomeric units (a) having at least one hydrophilic group and monomeric units (b) having at least one lipophilic side chain. Moreover, a method for producing said composition as well as the use of the composition is concerned.

18 Claims, No Drawings

AQUEOUS COMPOSITION FOR HARD SURFACE APPLICATIONS WITH ENHANCED STABILITY

REFERENCE TO RELATED APPLICATIONS

The present application claims priority to U.S. Provisional Application No. 62/345,267, filed Jun. 3, 2016.

FIELD OF THE INVENTION

The present invention relates to an aqueous composition for hard surface applications with enhanced stability, a method for producing said composition as well as the use of the composition, especially as metal working fluid.

BACKGROUND OF THE INVENTION

Compositions containing water and lipophilic substances as major components are used for various hard surface applications, e.g. for the treatment of metallic surfaces. In case of metallic surfaces, they are applied as metal working fluids, lubricants, rust preventives, cleaners or permanent coating compositions.

In these compositions, the functionality of water on the one hand side and of the lipophilic substances on the other hand side are combined—often in a synergistic manner. For instance, in case of metal working fluids, water functions as cooling agent, whereas, the lipophilic substances, especially oils, serve for enhancing lubricity.

Since water is not mixable with lipophilic substances per se, surfactants have to be used to enable mixing.

For water/oil/surfactant emulsion systems, there are only four thermodynamically stable phases, the so called Winsor Phases (Winsor, P. A. Trans. Faraday Soc. 1948, 44, 376).

They are easy to switch to one another through the so called phase transition process by various external stimuli like temperature, pressure, pH or contaminants (Bellocq, A. M.; Biais, J.; Bothorel, P.; Clin, B.; Fourche, G.; Lalanne, P.; Lemaire, B.; Lemanceau, B.; Roux, D. Adv. Colloid Interface Sci. 1984, 20, 167; Fletcher, P. D. I.; Howe, A. M.; Robinson, B. H. J. Chem. Soc. Faraday Trans. 1 1987, 83, 985; Olsson, U.; Wennerström, H. Adv. Colloid Interface Sci. 1994, 49, 113; Bourrel, M.; Schechter, R. S. 'Microemulsions and Related Systems' Marcel Dekker, 1988, New York; Shinoda, K.; Saito, H. J. Colloid Interface Sci. 1969, 34, 238).

During the phase transition, surfactants must move around to build different structures like micelles or continuous bilayers (Olsson, U.; Wennerström, H. Adv. Colloid Interface Sci. 1994, 49, 113; Israelachvili, J. N. Colloids Surf. A 1994, 91, 1).

However, random movement or migration of the surfactants causes instability of the emulsion and eventually ends up with detrimental phase separation as one of the phase transition behaviors: The faster the transition, the less stable the emulsion system.

BRIEF DESCRIPTION OF THE INVENTION

As will be explained hereinafter, the present invention provides improved aqueous compositions for hard surface applications containing at least one lipophilic compound. These compositions exhibit reduced surfactant mobility and consequently decreased phase separation.

According to the present invention, in the aqueous composition for hard surface applications containing at least one lipophilic compound and at least one copolymer, the at least one copolymer is a comb-type branched copolymer exhibiting an alternating sequence of monomeric units (a) having at least one hydrophilic group and monomeric units (b) having at least one lipophilic side chain.

The comb-type branched copolymer functions as an agent for dispersing the lipophilic substance in the aqueous medium of the composition, wherein micelles are built with the lipophilic side chains of the copolymer directed towards the included lipophilic substance and the hydrophilic groups towards the surrounding aqueous medium. At that, the backbone of the copolymer constrains the transition of the micelles to reverse micelles including water and being surrounded by a lipophilic medium.

In case of non-polymeric surfactants, said transition namely takes place by flipping of the lipophilic tails to the outer and of the hydrophilic head groups to the inner surface of the micelles. However, the backbone of the copolymer fixes the position of the lipophilic side chains and the hydrophilic groups enhancing the stability of the composition.

Besides functioning as surfactant itself, the comb-type branched copolymer connects other, low molecular surfactants, which may be contained in the aqueous composition, through its long chain polymer backbone, thereby constraining surfactant mobility, as a polymer moves much slower than small molecules. Due to this, phase separation may at least be delayed.

DETAILED DESCRIPTION OF THE PREFERRED EMBODIMENTS

The following paragraphs describe preferred embodiments of the composition according to the invention.

According to a preferred embodiment, the at least one hydrophilic group of the monomeric units (a) is at least one ionic group, more preferably at least one anionic group and especially preferably at least one anionic group selected from the group consisting of carboxylates, sulfonates and phosphonates. Most preferably, the at least one hydrophilic group is at least one carboxylate group, and even more preferably the monomeric units (a) are (meth)acrylic acid residues and/or succinic acid residues.

According to an especially preferred embodiment, the monomeric units (a) have two hydrophilic groups, more preferably two ionic groups, more preferably two anionic groups and especially preferably two carboxylate groups. Most preferably, the monomeric units (a) are succinic acid residues.

In case of surfactants bearing anionic head groups, hard water stability is usually an issue, as said head groups form insoluble or soluble salts with metal ions being contained in the hard water. Due to this, the interaction of the surfactants with the oil/water interface is negatively influenced.

However, comb-type branched copolymers according to the invention—even those bearing anionic head groups—exhibit excellent hard water stability.

Said copolymers have multiple head groups close together and—in case of two anionic groups—represent a kind of polymeric pseudo-twin head surfactant. Although some head groups may be combined to form insoluble or soluble metal ion salts by ion-exchange processes, there are still enough free head groups such that the copolymer configuration in the oil/water interface will not significantly change.

When adding an amine to the composition according to the invention, the anionic head groups of the copolymers form soluble amine salts positively influencing said interface interaction.

According to another embodiment, the at least one hydrophilic group of the monomeric units (a) is at least one non-ionic group, more preferably at least one group consisting of alkyleneoxy units and especially preferably at least one group consisting of ethyleneoxy, propyleneoxy and/or butyleneoxy units. Most preferably, the at least one hydrophilic group is at least one group consisting of ethyleneoxy groups.

As for the monomeric units (b), they have preferably one lipophilic side chain. This lipophilic side chain is preferably a linear or a branched hydrocarbon chain, more preferably a linear hydrocarbon chain, which preferably exhibits 4 to 20 and especially preferably exhibits 8 to 16 carbon atoms.

Most preferably, the hydrocarbon chain is linear and is octyl, decyl, dodecyl, tetradecyl and/or hexadecyl.

The longer is the hydrocarbon chain, the higher is the lipophilicity of the resulting copolymer and the lower is its HLB (hydrophilic-lipophilic-balance). In general, the HLB of a surfactant determines its water-solubility.

Preferably, the at least one copolymer in the composition according to the invention is a comb-type branched copolymer exhibiting an alternating sequence of (a) octylethylene, decylethylene, dodecylethylene, tetradecylethylene and/or hexadecylethylene and (b) succinic acid residue.

For the reaction with the monomers (b) in order to produce the at least one copolymer, succinic acid is preferably added as maleic acid anhydride to the reaction mixture (compare step i) in the method described below. Consequently, the at least one copolymer first contains succinic acid anhydride residues, which are, however hydrolyzed to succinic acid residues in the aqueous composition.

Preferably, the at least one copolymer exhibits a Mw in the range of 2,000 to 20,000 g/mol, more preferably in the range of 4,000 to 10,000 g/mol, wherein "Mw" stands for the weight average of the molecular weight.

Preferably, the at least one copolymer exhibits a MWD in the range of 1.2 to 5.0, more preferably in the range of 1.2 to 3.0, wherein "MWD" (Molecular Weight Distribution) means the ratio Mw:Mn with Mn as the number average of the molecular weight.

The concentration of the at least one copolymer in the aqueous composition is preferably within the range of 0.5 to 5.0 wt. %.

The composition according to the invention preferably contains an amine and/or a metal hydroxide, more preferably an amine and most preferably diglycolamine, wherein the composition preferably exhibits a weight ratio of the amine and/or metal hydroxide and the at least one copolymer in the range of 0.3:1 to 3.0:1, especially preferably in the range of 0.5:1 to 2:1 (calculated as diglycolamine and octylethylene or hexadecylethylene/succinic acid copolymer).

Amines and metal hydroxides may compensate for the pH drop, when adding the at least one copolymer to the aqueous composition.

Moreover, different amines can be used for fine-tuning the HLB of the copolymer. Due to the use of diglycolamine, the hydrophilicity of the copolymer may be increased.

According to a preferred embodiment, the composition according to the invention is an emulsion and contains as the at least one lipophilic compound at least one oil, preferably at least one oil selected from the group consisting of mineral, naphthenic, paraffinic and aromatic oil, more preferably naphthenic oil, wherein the composition more preferably exhibits a weight ratio of the at least one oil and the at least one copolymer in the range of 100:1 to 10:1, especially preferably in the range of 50:1 to 25:1 (calculated as naphthenic oil and octylethylene or hexadecylethylene/succinic acid copolymer and assuming a weight ratio of oil and water of 1:1).

Depending on the intended hard surface application, the properties of the composition according to the invention may be tailored by adding different kinds of additives.

In detail said additives may be neutralizers, emulsifiers, lubricity enhancers, biocides, fungicides, metal deactivators and/or stability enhancers for freeze/thaw cycles.

Further on, the additives may serve for anti-corrosion, pH-control, coupling, wetting, microbial control and/or against foam formation.

The present invention also relates a method for producing the composition according to the invention, wherein the following steps are conducted successively:
i) at least one kind of radically polymerizable monomers (a) having at least one hydrophilic group and at least one kind of radically polymerizable monomers (b) having at least one lipophilic side chain are mixed in an organic solvent and/or a base oil,
ii) the resulting mixture is brought to a temperature in the range of 15 to 140° C.,
iii) a radical initiator is added dropwise over a time period of 2 to 8, preferably of 2 to 5 hours
iv) the reaction is continued for 1 to 8 hours, preferably for 2 to 4 hours,
v) optionally the organic solvent is removed and
vi) the so obtained at least one copolymer is added to an aqueous composition containing at least one lipophilic substance.

According to a first preferred embodiment the following steps are conducted successively:
i) at least one kind of radically polymerizable monomers (a) having at least one hydrophilic group and at least one kind of radically polymerizable monomers (b) having at least one lipophilic side chain are mixed in an organic solvent and/or a base oil,
ii) the resulting mixture is brought to a temperature in the range of 70 to 140° C., preferably in the range of 100 to 115° C.,
iii) a thermal radical initiator is added dropwise over a time period of 2 to 8, preferably of 2 to 5 hours,
iv) the reaction is continued for 1 to 8 hours, preferably for 2 to 4 hours,
v) optionally the organic solvent is removed and
vi) the so obtained at least one copolymer is added to an aqueous composition containing at least one lipophilic substance.

According to a second preferred embodiment, the following steps are conducted successively:
i) at least one kind of radically polymerizable monomers (a) having at least one hydrophilic group and at least one kind of radically polymerizable monomers (b) having at least one lipophilic side chain are mixed in an organic solvent and/or a base oil,
ii) the resulting mixture is brought to room temperature, i.e. to a temperature in the range of 15 to 30° C.,
iii) a redox type low temperature initiator is added dropwise over a time period of 2 to 8, preferably of 2 to 5 hours,
iv) the reaction is continued for 1 to 8 hours, preferably for 2 to 4 hours,
v) optionally the organic solvent is removed and vi) the so obtained at least one copolymer is added to an aqueous composition containing at least one lipophilic substance.

According to a third preferred embodiment, the following steps are conducted successively:

i) at least one kind of radically polymerizable monomers (a) having at least one hydrophilic group and at least one kind of radically polymerizable monomers (b) having at least one lipophilic side chain are mixed in an organic solvent and/or a base oil, ii) the resulting mixture is brought to room temperature, i.e. to a temperature in the range of 15 to 30° C., iii) an initiator releasing a tributyl tin radical upon UV irradiation is added dropwise over a time period of 2 to 8, preferably of 2 to 5 hours while the mixture is exposed to UV radiation, iv) the reaction is continued for 1 to 8 hours, preferably for 2 to 4 hours, v) optionally the organic solvent is removed and vi) the so obtained at least one copolymer is added to an aqueous composition containing at least one lipophilic substance.

In all of the above preferred embodiments the conversion of the monomers (a) and the monomers (b) to the at least one copolymer determined by GPC (Gel Permeation Chromatography) is approximately 90 to 97% of the theoretically possible conversion, which is acceptable for large scale production.

The MWD of the at least one copolymer obtained with the above method is in the range of 1.2 to 3.0 depending on the Mw.

The organic solvent in step i) of the above process is preferably toluene, whereas the base oil is preferably a naphthenic base oil consisting of approximately 8 to 10 wt. % of aromatic hydrocarbon (Ca), approximately 43 to 47 wt. % of naphthenic hydrocarbon (Cn) and approximately 45 to 47 wt. % of paraffinic hydrocarbon (Cp) (adding up to 100 wt. %).

Especially preferably, the mixture in step i) of the above process contains toluene as organic solvent and a naphthenic oil consisting of approximately 8 to 10 wt. % of aromatic hydrocarbon (Ca), approximately 43 to 47 wt. % of naphthenic hydrocarbon (Cn) and approximately 45 to 47 wt. % of paraffinic hydrocarbon (Cp) (adding up to 100 wt. %) as base oil with a weight ratio of less than 0.5:1, preferably of less than 0.1:1.

Surprisingly, it was found, that the lower is the content of toluene in the toluene/base oil mixture, the higher is the conversion of the monomers to the copolymer. This especially applies for the production of a copolymer exhibiting an alternating sequence of (a) tetradecylethylene and (b) succinic acid residue, wherein the conversion is calculated from 1-hexadecene consumption by 1H NMR.

The overall concentration of the monomers (a) and the monomers (b) in step i) of the above process is in the range of 20 to 70 wt. %, preferably in the range of 30 to 55 wt. %.

Surprisingly, it was found, that the obtained Mw of the at least one copolymer may be controlled by the overall concentration of the monomers in step i): The higher is the concentration, the higher is the Mw.

Additionally it has been found, that the longer the lipophilic side chains of the monomers (b) are, the lower is the obtained Mw and the narrower is the obtained MWD.

Finally, the present invention relates to the use of the composition according to the invention in hard surface applications.

The composition is preferably used for the treatment of metallic surfaces, more preferably as metalworking fluid, as lubricant, as rust preventive, as cleaner and/or for permanent coating of metallic surfaces. The use of the composition as metal working fluid is especially preferred.

The present invention should be pointed out by the following examples without thereby limiting the scope of the invention.

EXAMPLES i) Preparation α-Olefin/Maleic Anhydride Copolymers

C10-, C12-, C16- or C18-α-olefin, respectively, and maleic anhydride were mixed in a reaction vessel using toluene as the solvent. The resulting mixture contained an overall monomer concentration of 30 wt. % and was heated to 105° C. Then, a thermal radical initiator diluted in toluene was slowly added dropwise into the reaction vessel over approximately 3 to 5 hours using an addition funnel, and, after complete addition, the reaction was continued for additional 2 to 4 hours. By stripping toluene, the according α-olefin/maleic anhydride copolymers were obtained in form of a white solid.

ii) Application as High Oil Semi-Synthetic Metalworking Fluid

A concentrate (E1) was made by adding 0.5 wt. % of C16-α-olefin/maleic anhydride copolymer and 0.5 wt. % of diglycolamine to 99 wt. % of a composition A containing 15 to 21 wt. % deionized water,
9.5 to 13.5 wt. % amine mixture (for anti-corrosion, pH-control, as neutralizer),
4.0 to 7.0 wt. % TOFA (oleic acid-fatty acid mixture as lubricity enhancer),
12.0 to 16.5 wt. % emulsifier mixture (for anti-corrosion, coupling, wetting, as biocide),
0.4 to 0.6 wt. % Troysan Polyphase FX40 (as fungicide),
0.6 to 0.8 wt. % benzotriazole (as metal deactivator),
40 to 55 wt. % Hydrocal 100 (naphthenic oil),
1.7 to 2.5 wt. % HD Ocenol 80/85 (lipophilic coupler as stability enhancer for freeze/thawcycles) and
0.15 to 0.25 wt. % FOAM BAN HP 730 (siloxane defoamer: 3D-siloxane in PAG), wherein the components of composition A add up to 100 wt. %.

Additionally, a dilution containing 5 wt. % of the above concentrate in deionized water was produced (E2).

The emulsion stability of the concentrate as well as of the dilution was evaluated at 50° C. for 3 days using a TurbiScan™ device (Formulaction Inc., Worthington, Ohio). The results were then compared with composition A as baseline (C1: concentrate, C2: 5 wt. % of the concentrate in deionized water).

The TurbiScan™ device monitors droplet size change by means of transmission or backscattering intensity measurement. At several time points within the 3 days, transmission (%) curves were produced over a range of 0 to 50 mm. For each sample, the change of transmission (ΔTM) was determined between the final (2 days, 19.5 hours) and the initial value of transmission—in the bottom, in the middle as well as in the top zone of the above range.

The higher the ΔTM, the more potential phase separation, i.e. the lower the stability of the according sample.

As indicated in the following table, by adding 0.5 wt. % of the copolymer according to the invention a significant improvement in stability was obtained.

| (Comparative) Example | ΔTM zone 1: 2.92 mm | ΔTM zone 2: 25.0 mm | ΔTM zone 3: 42.6 mm |
|---|---|---|---|
| C1 | 4.47% | 3.82% | 16.29% |
| E1 | 0.08% | 0.71% | 8.34% |

Due to the low concentration of the polymer according to the invention (0.025 wt. %) the stability enhancement faded in case of the dilution (compare the following table).

| (Comparative) Example | ΔTM zone 1: 2.92 mm | ΔTM zone 2: 25.0 mm | ΔTM zone 3: 42.0 mm |
|---|---|---|---|
| C2 | 1.21% | 0.98% | 0.39% |
| E2 | 0.45% | 0.37% | 0.28% | iii) Application as Low Oil Semi-Synthetic Metalworking Fluid

A first concentrate (E3) was made by adding 0.4 wt. % of C10-α-olefin/maleic anhydride copolymer, 0.6 wt. % of C16-α-olefin/maleic anhydride copolymer and 1.0 wt. % of diglycolamine to 98 wt. % of a composition B containing

| | |
|---|---|
| 45 to 63 wt. % | deionized water, |
| 0.8 to 1.2 wt. % | KOH (40%) (Metal oxide as neutralizer), |
| 9.5 to 13.5 wt. % | amine mixture (for anti-corrosion, microbial control, pH-control, as neutralizer), |
| 3.4 to 4.6 wt. % | boric acid (Boric acid for anti-corrosion), |
| 15 to 22 wt.% | emulsifier mixture (for anti-corrosion, wetting, coupling, against foam formation, as lubricity enhancer, biocide), |
| 8.5 to 11.5 wt. % | Hydrocal 100 (naphthenic oil), |
| 0.4 to 0.6 wt. % | HD Ocenol 80/85 (lipophilic alcohol coupler as stability enhancer for freeze/thaw cycles) and |
| 0.15 to 0.25 wt. % | FOAM BAN HP 730 (siloxane defoamer 3D-siloxane in PAG), wherein the components of composition B add up to 100 wt. %. |

A second concentrate was made by adding 0.4 wt. % of C10-α-olefin/maleic anhydride copolymer, 0.6 wt. % of C16-α-olefin/maleic anhydride copolymer, 0.6 wt. % of C18-α-olefin/maleic anhydride copolymer and 1.6 wt. % of diglycolamine to 96.8 wt. % of composition B (E4).

Additionally, a dilution containing 5 wt. % of the first concentrate in deionized water (E5) as well as a dilution containing 5 wt. % of the second concentrate in deionized water (E6) was produced.

Both, concentrate and dilution stabilities were evaluated at 50° C. for 11 days using a TurbiScan™ device. For investigation of the temperature effect on stability, the device was also run at two different temperatures, at 25° C. and at 50° C., wherein the temperature increased from 25° C. to 50° C. over 2 hours. The results were then compared with composition B as baseline (C3: concentrate, C4: 5 wt. % of the concentrate in deionized water).

At several time points within the 11 days, backscattering (%) curves (for C3, E3 and E4) or transmission (%) curves (for C4, E5 and E6) were produced over a range of 0 to 50 mm in order to monitor droplet size change. For each sample, the change in backscattering or transmission (ΔBS or ΔTM) was determined between the final (10 days, 22 hours) and the initial value—in the middle zone of the above range (20-30 mm).

For both concentrates E3 and E4 substantial improvement in stability compared to C3 was evidenced by steep change in ΔBS as highlighted in the following table. The same applies for the according dilutions E5 and E6 compared to C4 in ΔTM.

| (Comparative) Example | ΔBS or ΔTM zone: 20-30 mm |
|---|---|
| C3 | 14.24% |
| E3 | 3.34% |
| E4 | 3.72% |
| C4 | 55.15% |
| E5 | 2.55% |
| E6 | 0.94% |

For both concentrates E3 and E4 susceptibility of the stability to temperature change was also significantly improved compared to C3 as indicated in the table below. The same applies for the according dilutions E5 and E6 compared to C4.

It should also be noted, that the concentrate according to C3 was phase-separated in a day at 50° C. On the other hand, the concentrates according to E3 and E4 exhibited excellent stability maintaining the initial homogeneous phase with constant clarity even after 15 days. Similarly the dilution according to C4 turned cloudy with experimental time elapse while the dilutions according to E5 and E6 retained their clarities.

| (Comparative) Example | ΔBS or ΔTM zone: 20-30 mm |
|---|---|
| C3 | 13.03% |
| E3 | 4.96% |
| E4 | 2.75% |
| C4 | 12.36% |
| E5 | 1.60% |
| E6 | 1.59% | iv) Hard Water Stability of Semi-Synthetic Metalworking Fluid

Valicor water (200 ppm Al, 250 ppm Mg, 179 ppm Ca, 200 ppm Na) is known as the most severe hard water condition. In order to determine hard water stability, a 5 wt. % dilution of concentrate C3 and a 5 wt. % dilution of concentrate E3—each in valicor water—were produced.

The obtained dilutions were stored at 50° C. The dilution of E3 containing copolymers according to the invention showed no phase separation—neither after 6 nor after 24 hours of storage—while the dilution of C3 without such copolymers was phase-separated with a opaque phase on the top—already after 6 hours and even more after 24 hours of storage.

v) Q-Sense and EDX Analysis of Coated and Uncoated Aluminum Surface 1.0 wt. % of C10-α-olefin/maleic anhydride copolymer, 1.0 wt. % of C18-α-olefin/maleic anhydride copolymer—each in 99.0 wt. % of toluene—and toluene without any copolymers according to the invention, respectively, were applied on the aluminum surface sensor of a Q-sense (Quartz Crystal Microbalance; provider: Biolin Scientific Holding AB, Sweden).

After 24 hours of air-drying at room temperature, a solution of 5 wt. % of NaCl in deionized water was flowing on the so coated aluminum surface for about 3 days at room temperature.

During said period the frequency (F) as well as the dissipation (D) was measured.

As for the Q-sense, a detected frequency (F) change indicates a surface weight change, whereas a dissipation (D) change indicates a viscoelastic property change of the surface.

The aluminum surface coated with C10-α-olefin/maleic anhydride copolymer as well as the aluminum surface coated with C18-α-olefin/maleic anhydride copolymer showed much less change than the uncoated aluminum surface—both, in F and in D—indicating better surface stability to NaCl solution.

The approximate changes (derived from the graph F/D vs. time) are shown in the following table (approx. ΔF/ΔD). In each case, five parallel samples were measured.

| Sample | Approx. ΔF | Approx. ΔD |
|---|---|---|
| Uncoated Al surface | 500-1000 | 50-200 |
| Al surface coated with C10-α-olefin/maleic anhydride copolymer | 60-90 | 5-30 |
| Al surface coated with C18-α-olefin/maleic anhydride copolymer | 8-12 | 3-6 |

As can be seen, the changes in F and in D are less in case of the C18-α-olefin/maleic anhydride copolymer. Thus, the stability achieved by the latter is more pronounced in comparison with the C10-α-olefin/maleic anhydride copolymer.

EDX (Energy Dispersive X-Ray) surface analysis showed results consistent with those obtained by Q-sense:

More carbon was detected on the aluminum surface treated with copolymer than on the untreated aluminum surface, which confirms a coating with copolymer. It should be noted that the uncoated surface showed a majority of no aluminum area indicating that the aluminum layer could be washed out by NaCl solution flowing for 3 days.

Example aspects of the invention thus may be stated to be at least the following:

1. Aqueous composition for hard surface applications containing at least one lipophilic compound and at least one copolymer characterized in that the at least one copolymer is a comb-type branched copolymer exhibiting an alternating sequence of monomeric units (a) having at least one hydrophilic group and monomeric units (b) having at least one lipophilic side chain.
2. Composition according to 1 characterized in that the at least one hydrophilic group of the monomeric units (a) is at least one ionic group.
3. Composition according to 2 characterized in that the at least one ionic group is at least one carboxylate group.
4. Composition according to 3 characterized in that the monomeric units (a) have two carboxylate groups.
5. Composition according to 4 characterized in that the monomeric units (a) are succinic acid residues.
6. Composition according to one of the preceding aspects characterized in that the monomeric units (b) have one lipophilic side chain.
7. Composition according to characterized in that the lipophilic side chain is a linear hydrocarbon chain.
8. Composition according to 7 characterized in that the hydrocarbon chain exhibits 4 to 20, preferably 8 to 16 carbon atoms.
9. Composition according to one of the preceding aspects characterized in that the at least one copolymer exhibits a Mw in the range of 2,000 to 20,000 g/mol, preferably in the range of 4,000 to 10,000 g/mol.
10. Composition according to one of the preceding aspects characterized in that the at least one copolymer exhibits a MWD in the range of 1.2 to 3.0.
11. Composition according to one of the preceding aspects characterized in that it contains an amine and/or a metal hydroxide.
12. Composition according to 11 characterized in that it exhibits a weight ratio of the amine and/or metal hydroxide and the at least one copolymer in the range of 0.3:1 to 3.0:1 (calculated as diglycolamine and octylethylene or hexadecylethylene/succinic acid copolymer).
13. Composition according to one of the preceding aspects characterized in that it is an emulsion and contains as the at least one lipophilic compound at least one oil.
14. Composition according to 13 characterized in that it exhibits a weight ratio of the at least one oil and the at least one copolymer in the range of 100:1 to 10:1 (calculated as naphthenic oil and octylethylene or hexadecylethylene/succinic acid copolymer and assuming a weight ratio of oil and water of 1:1).
15. Method for producing a composition according to one of the preceding aspects characterized in that the following steps are conducted successively:
    i) at least one kind of radically polymerizable monomers (a) having at least one hydrophilic group and at least one kind of radically polymerizable monomers (b) having at least one lipophilic side chain are mixed in an organic solvent and/or base oil,
    ii) the resulting mixture is brought to a temperature in the range of 15 to 140° C.,
    iii) a radical initiator is added dropwise over a time period of 2 to 8, preferably of 2 to 5 hours,
    iv) the reaction is continued for 1 to 8 hours, preferably for 2 to 4 hours,
    v) optionally the organic solvent is removed and
    vi) the so obtained at least one copolymer is added to an aqueous composition containing at least one lipophilic substance.
16. Method according to 15 characterized in that the organic solvent is toluene, whereas the base oil is a naphthenic base oil consisting of approximately 8 to 10 wt. % of aromatic hydrocarbon (Ca), approximately 43 to 47 wt. % of naphthenic hydrocarbon (Cn) and approximately 45 to 47 wt. % of paraffinic hydrocarbon (Cp) (adding up to 100 wt. %).
17. Method according to 16 characterized in that the mixture in step i) contains toluene as organic solvent and a naphthenic oil consisting of approximately 8 to 10 wt. % of aromatic hydrocarbon (Ca), approximately 43 to 47 wt. % of naphthenic hydrocarbon (Cn) and approximately 45 to 47 wt. % of paraffinic hydrocarbon (Cp) (adding up to 100 wt. %) as base oil with a weight ratio of less than 0.5:1, preferably of less than 0.1:1.
18. Method according to one of aspects 15 to 17 characterized in that the overall concentration of the monomers (a) and the monomers (b) in step i) is in the range of 20 to 70 wt. %, preferably in the range of 30 to 55 wt. %.
19. Use of a composition according to one of the aspects 1 to 14 in hard surface applications, preferably for the treatment of metallic surfaces, more preferably as metal-working fluid, as lubricant, as rust preventive, as cleaner and/or for permanent coating of metallic surfaces.
20. Use according to 19 as metal working fluid.

The invention claimed is:

1. An aqueous composition for hard surface applications comprising at least one lipophilic compound that is an oil and at least one copolymer, characterized in that the at least one copolymer is a comb-type branched copolymer exhibiting an alternating sequence of monomeric units (a) each having at least one hydrophilic group and monomeric units (b) each having at least one lipophilic side chain,
wherein the at least one copolymer exhibits a molecular weight distribution the range of 1.2 to 3.0.

2. The composition according to claim 1 characterized in that the at least one hydrophilic group of the monomeric units (a) is at least one ionic group.

3. The composition according to claim 2 characterized in that the at least one ionic group is at least one carboxylate group.

4. The composition according to claim 3 characterized in that the monomeric units (a) each have two carboxylate groups.

5. The composition according to claim 4 characterized in that the monomeric units (a) each are succinic acid residues.

6. The composition according to claim 1 characterized in that the monomeric units (b) each have one lipophilic side chain.

7. The composition according to claim 6 characterized in that the lipophilic side chain is a linear hydrocarbon chain.

8. The composition according to claim 7 characterized in that the hydrocarbon chain exhibits 4 to 20 carbon atoms.

9. The composition according to claim 1 characterized in that the at least one copolymer exhibits a Mw in the range of 2,000 to 20,000 g/mol.

10. The composition according to claim 1 characterized in that it further comprises an amine and/or a metal hydroxide.

11. The composition according to claim 10 characterized in that it exhibits a weight ratio of the amine and/or metal hydroxide and the at least one copolymer in the range of 0.3:1 to 3.0:1.

12. The composition according to claim 1 characterized in that it exhibits a weight ratio of the at least one oil and the at least one copolymer in the range of 100:1 to 10:1.

13. A method for producing a composition according to claim 1 characterized in that the following steps are conducted successively:
i) at least one kind of radically polymerizable monomers (a) each having at least one hydrophilic group and at least one kind of radically polymerizable monomers (b) each having at least one lipophilic side chain are mixed in an organic solvent and/or base oil,
ii) the resulting mixture is brought to a temperature in the range of 15 to 140° C.,
iii) a radical initiator is added dropwise over a time period of 2 to 8 hours to form the at least one copolymer
iv) the reaction is continued for 1 to 8 hours,
v) optionally the organic solvent is removed and
vi) the so obtained at least one copolymer is added to an aqueous composition comprising at least one lipophilic compound.

14. The method according to claim 13 characterized in that the organic solvent comprises toluene, whereas the base oil is a naphthenic base oil consisting of approximately 8 to 10 wt. % of aromatic hydrocarbon (Ca), approximately 43 to 47 wt. % of naphthenic hydrocarbon (Cn) and approximately 45 to 47 wt. % of paraffinic hydrocarbon (Cp) (adding up to 100 wt. %).

15. The method according to claim 14 characterized in that the mixture in step i) comprises toluene as organic solvent and a naphthenic oil consisting of approximately 8 to 10 wt. % of aromatic hydrocarbon (Ca), approximately 43 to 47 wt. % of naphthenic hydrocarbon (Cn) and approximately 45 to 47 wt. % of paraffinic hydrocarbon (Cp) (adding up to 100 wt. %) as base oil with a weight ratio of less than 0.5:1.

16. The method according to claim 13 characterized in that the overall concentration of the monomers (a) and the monomers (b) in step i) is in the range of 20 to 70 wt. %.

17. A method comprising applying a fluid comprising a composition according to claim 1 to a hard surface as a metal working fluid, lubricant, rust preventer, cleanser and/or permanent coating.

18. The method according to claim 17 wherein the hard surface is a metallic surface and the fluid is applied as a metal working fluid.

* * * * *